US000001318H

United States Statutory Invention Registration [19]

[11] Reg. Number: H1318

Rozenboom et al. [43] Published: Jun. 7, 1994

[54] COMPOSITE TRUCK BODY FLOOR

[75] Inventors: Nathan G. Rozenboom, Metamora; Gerald P. Simmons, Morton, both of Ill.

[73] Assignee: Caterpillar Inc., Del.

[21] Appl. No.: 132,269

[22] Filed: Oct. 6, 1993

[51] Int. Cl.[5] ..... B62D 33/02
[52] U.S. Cl. ..... 296/39.2; 296/183
[58] Field of Search ..... 296/39.1, 39.2, 183

[56] References Cited

U.S. PATENT DOCUMENTS

| | | | |
|---|---|---|---|
| 2,756,095 | 7/1956 | Schnell | 296/28 |
| 4,083,595 | 4/1978 | Maier | 296/29 |
| 4,101,704 | 7/1978 | Hiles | 428/218 |
| 4,396,219 | 8/1983 | Cline | 296/39 |
| 4,768,822 | 9/1988 | Gower | 296/39 |
| 4,779,390 | 10/1988 | Repper et al. | 52/222 |
| 4,802,705 | 2/1989 | Elwell | 296/39.2 |
| 4,826,233 | 5/1989 | Hagenbuch | 296/39.3 |
| 4,986,590 | 1/1991 | Patti et al. | 296/39.2 |
| 5,052,737 | 10/1991 | Farmer, Jr. | 296/39.2 |
| 5,131,709 | 7/1992 | Spica | 296/39.2 |

*Primary Examiner*—David H. Brown

*Attorney, Agent, or Firm*—Calvin E. Glastetter

[57] ABSTRACT

Truck bodies are useful for receiving and transporting material from an excavation site. When abrasive material is being loaded and transported, the truck body is equipped with a hardened replaceable wear member to reduce wear and denting. The truck body includes a plurality of base members welded together. A non-metallic member is bonded to the base members. A hardened replaceable wear member is bonded to the non-metallic member. This arrangement of components provides truck body floors which have hardened wear members, which are bonded to the base members, thus, eliminating the need for welding.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPOSITE TRUCK BODY FLOOR

DESCRIPTION

1. Technical Field

This invention relates generally to a truck body floor and more particularly to a composite truck body floor having an intermediate layer of nonmetallic material bonded to a metallic base member or a metallic wear member.

2. Background Art

Truck bodies are commonly used to haul abrasive material which are dropped into the truck body. The truck body must withstand and absorb the force of the material being dropped into the truck body of the truck. In an effort to reduce abrasive wear and denting, it is common to weld replaceable wear material to the base member. One of the problems associated with such an arrangement is that the hardness of the wear material must be limited because the weldability of the wear material decreases as the hardness is increased.

The present invention is directed to overcoming one or more of the problems as set forth above.

DISCLOSURE OF THE INVENTION

In one aspect of the present invention, a composite truck body floor includes a metallic base member. The truck body floor further includes a metallic wear member. A non-metallic material is positioned and bonded between the metallic base member and the metallic wear member.

The present invention provides a composite truck body floor which has a replaceable hardened wear material to reduce abrasive wear and denting. The wear material is positioned and held in place without welding.

BEST MODE FOR CARRYING OUT THE INVENTION

Figure 1:
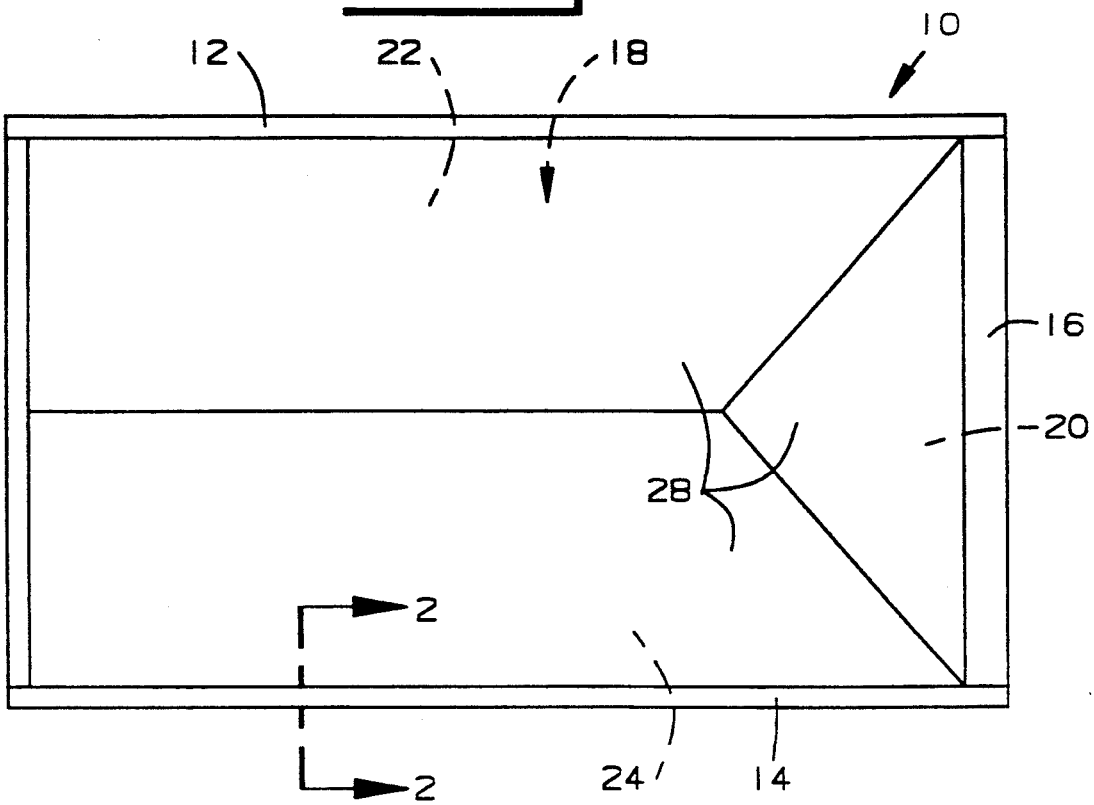
FIG. 1 is a plan view of a truck body employing the present invention.
Figure 2:
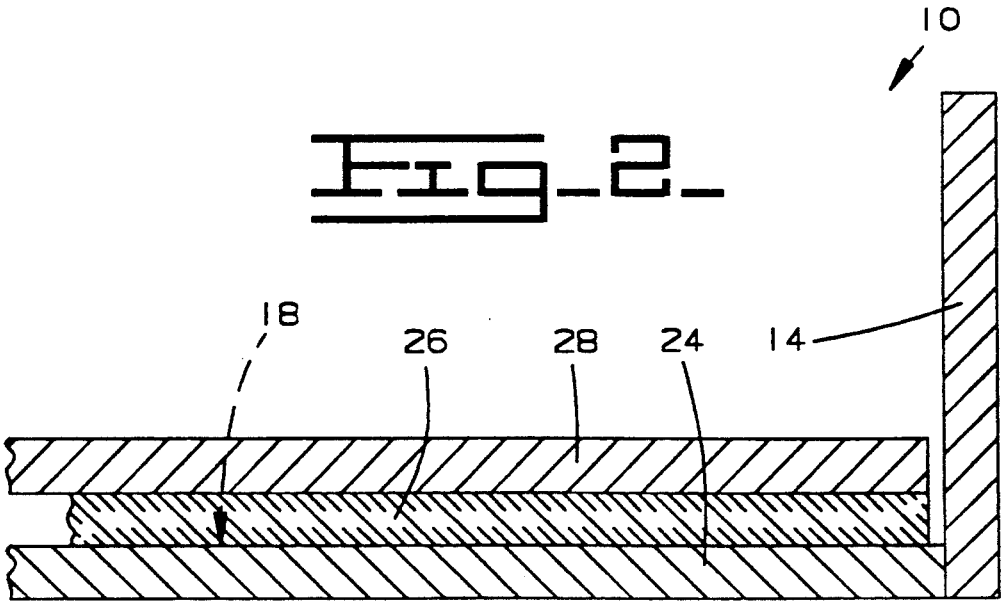
FIG. 2 is a cross-section of the floor of the truck body as shown by line 2—2 in FIG. 1.

Referring now to the drawings, a truck body 10 is shown. The truck body 10 includes a first side wall 12, and a second side wall 14 spaced from the first side wall 12. A front wall 16 connects the first and second side walls 12,14 together. A floor assembly 18 is connected to the first and second side walls 12,14 and the front wall 16 to form a material receiving compartment. The floor assembly 18 is constructed of a plurality of base members 20,22 and 24. The first base member 20 is welded to the front wall 16. The second base member 22 is welded to the first side wall 12 and the first base member 20. The third base member 24 is welded to the second side wall 14, the first base member 20 and the second base member 22 to form a load carrying surface. The base members are formed of a material having a predetermined hardness. A non-metallic member 26 is positioned over and bonded to the floor 18. The non-metallic member 26 can be constructed of one piece or can be a plurality of pieces which conform to the shape of the base members 20,22 and 24. The non-metallic member 26 can alternately be formed from a material that can be sprayed onto the base members 20,22 and 24. A plurality of replaceable wear members 28 are positioned and bonded over the non-metallic member 26 to provide a surface which will reduce abrasive wear and denting as material is loaded or unloaded. The wear members 28 are formed of a material having a predetermined hardness greater then the predetermined hardness of the floor assembly 18. The wear member 28 is bonded to the non-metallic member 26, therefore, no welding is required for maintaining the wear member 28 in position.

Industrial Applicability

In use of the present invention, a truck body 10 is constructed by welding various components together. The truck body 10 includes a floor assembly 18 formed by welding together the base members 20,22 and 24. A non-metallic member 26 is bonded to the floor assembly. A replaceable wear member 28 is bonded to the non-metallic member 26.

In view of the foregoing, it is readily apparent that the structure of the present invention provides a truck body floor assembly which provides a replaceable wear member which can be used without requiring the use of welding to attach the replaceable wear member to the base members.

Other aspects, objects and advantages of the invention can be obtained from a study of the drawings, the disclosure and the appended claims.

We claim:

1. A composite truck body, comprising:

a metallic base member forming a floor of the truck body, the base member has a predetermined material hardness;

a metallic wear member spaced from the metallic base member, the wear member has a predetermined material hardness which is greater then the predetermined hardness of the base member; and a non-metallic material positioned and bonded between the base member and the wear member.

* * * * *